(12) United States Patent
Teboulle et al.

(10) Patent No.: US 11,303,468 B2
(45) Date of Patent: Apr. 12, 2022

(54) EQUIPMENT ADAPTED FOR BEING CONNECTED TO AN AMM SYSTEM

(71) Applicant: SAGEMCOM ENERGY & TELECOM SAS, Rueil Malmaison (FR)

(72) Inventors: Henri Teboulle, Rueil Malmaison (FR); Thierry Vernet, Rueil Malmaison (FR); Jean-Paul Lecappon, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 17/051,251

(22) PCT Filed: May 9, 2019

(86) PCT No.: PCT/EP2019/061914
§ 371 (c)(1),
(2) Date: Oct. 28, 2020

(87) PCT Pub. No.: WO2019/219496
PCT Pub. Date: Nov. 21, 2019

(65) Prior Publication Data
US 2021/0234722 A1 Jul. 29, 2021

(30) Foreign Application Priority Data
May 17, 2018 (FR) ...................................... 1854114

(51) Int. Cl.
*G08C 15/06* (2006.01)
*H04L 12/28* (2006.01)

(52) U.S. Cl.
CPC ...... *H04L 12/2825* (2013.01); *H04L 12/2854* (2013.01); *H04L 12/2834* (2013.01)

(58) Field of Classification Search
None
See application file for complete search history.

(56) References Cited

U.S. PATENT DOCUMENTS

| 2003/0204756 A1* | 10/2003 | Ransom | ............... H02H 1/0061 713/300 |
| 2014/0025321 A1* | 1/2014 | Spanier | ............... G01R 22/063 702/62 |

(Continued)

FOREIGN PATENT DOCUMENTS

| CA | 2300274 A1 * | 2/1999 | ............. G06F 13/36 |
| EP | 3037835 A2 * | 6/2016 | ............... G01V 3/10 |

(Continued)

OTHER PUBLICATIONS

Jun. 7, 2019 International Search Report issued in International Patent Application No. PCT/EP2019/061914.

(Continued)

*Primary Examiner* — Phyllis A Book
(74) *Attorney, Agent, or Firm* — Oliff PLC; R. Brian Drozd (57) ABSTRACT

An equipment connected to a system of the AMM type that includes at least one data concentrator to which smart electricity meters, referred to as meters, are attached, via a first powerline network, each data concentrator being connected to a management system via a second network and serving as relays between said meters and the management system. The equipment is connected to a data concentrator via a third network and comprises at least one communication interface with a fourth network, said fourth network enabling at least one device connected to said fourth network to communicate with the equipment. The equipment can thus relay commands intended for a device of the actuator type connected to the fourth network and transfer (Continued)

alarms to the management system according to data supplied to said equipment by devices of the sensor type connected to said fourth network.

20 Claims, 5 Drawing Sheets

(56) References Cited

U.S. PATENT DOCUMENTS

2016/0093001 A1* 3/2016 Dherbecourt ............ H04Q 9/00
                                                            705/412
2017/0171090 A1* 6/2017 Britt .................... H04L 47/2475

FOREIGN PATENT DOCUMENTS

| EP | 3037835 A2 | 6/2016 | | |
|---|---|---|---|---|
| EP | 3122061 A1 | 1/2017 | | |
| WO | WO-0122186 A1 * | 3/2001 | ............. | H04L 67/12 |
| WO | WO-2011064865 A1 * | 6/2011 | ........ | H02J 13/00028 |

OTHER PUBLICATIONS

Craemer et al.; "Analysis of State-of-the-art Smart Metering Communication Standards;" Proceedings of the 5th Young Researchers Symposium (YRS); pp. 1-6; Mar. 1, 2010.

* cited by examiner

| 33110 | 33111 | 33112 | | 33113 |

EQUIPMENT ADAPTED FOR BEING CONNECTED TO AN AMM SYSTEM

The present invention relates to equipment adapted for being connected to a system for the automatic management of electricity meter readings, a communication system comprising said equipment and methods at least partly performed by said equipment.

The purpose of electricity transport networks, such as the French public electricity transport network, is to convey large quantities of electricity over great distances. Such networks are generally referred to as high voltage networks (HV networks) since they transport currents having a voltage greater than 50 kV. These HV networks are equipped with sensors and actuators for managing these networks. The sensors are for example temperature, pressure and movement sensors, and the actuators are for example switches. Such management, referred to as smart management, makes it possible in particular to adapt at any time a production and a consumption of electricity on the HV networks, which in particular makes it possible to make savings in energy and to circumvent any faults in the network.

As for electricity distribution networks, these are intended to convey electricity over shorter distances for supply of local consumption, but also for connection of numerous producers of low and medium power electricity. These networks are generally referred to as medium or low voltage networks (MV or LV networks) since they transport currents having respectively a voltage of between 1 kV and 50 kV and less than 1 kV. A need for smart management of this type of network is also making itself felt firstly in order better to manage faults on the MV and LV networks and to achieve savings in energy, but also secondly in order better to integrate the production of electricity by renewable energy. Currently no solution exists for allowing smart management of MV and LV networks as is done in HV networks.

There do however exist communication means, in particular in LV networks, making it possible to transfer, to a centralised unit, information coming from terminals in the LV network. Powerline communication networks for AMM (Automated Meter Management) systems thus use infrastructures of LV networks (physical network) for creating a so-called logic network. Among such logic networks, referred to as PLC (powerline) networks, mention can be made of networks in accordance with the PRIME (PoweRline Intelligent Metering Evolution) specifications or networks in accordance with the G3-PLC standard specified in the ITU-T recommendation G.9903. In PLC networks, communications are established between electricity meters, referred to as smart meters, and a device called a data concentrator in order in particular to allow automated remote reading of electricity consumption measurements made by said smart electricity meters. Hereinafter each smart electricity meter is simply referred to as a meter. A plurality of data concentrators is typically geographically deployed in a PLC network so as to distribute the remote management load of a multitude of meters. Each data concentrator is itself connected to a same centralised unit for managing the AMM system, which is managed by an operator of the electricity supply network to which said meters are connected.

As the acronym AMM indicates, PLC networks for systems of the AMM type are intended to manage metrology data coming from the meters. PLC networks therefore do not make it possible to transfer information coming from sensors, nor to control actuators.

With the recent appearance of the Internet of Things (IoT) a new type of network has appeared: long-range wireless networks with low energy consumption (low power wide area networks (LPWANs)). Among these LPWAN networks, mention can be made of networks based on the LoRa (long range) (registered trade mark) technology.

A network based on the LoRa technology (hereinafter referred to as a LoRa network) uses a protocol called LoRaWAN. A LoRa network is composed of base stations or gateways generally placed on high points in order to cover a large geographical area. The gateways are able to detect messages sent in their area by equipment or terminals ("endpoints") and to transfer them to at least one server (LoRa network server (LNS)), which will process them.

In a conventional functioning of a LoRa network, a terminal wishing to transmit a message (i.e. data) to the server, transmits this message in a frame, referred to as an uplink frame, in accordance with the LoRaWAN protocol. The uplink frame is transmitted in broadcast mode. This uplink frame is received by at least one gateway. Each gateway that has received the frame decodes it and transmits the message to the server in an HTTP (HyperText Transfer Protocol) request. If a plurality of gateways have received the frame, the server receives a plurality of HTTP requests containing the message. The server must then designate, among the gateways that receive the uplink frame, the gateway to be used for relaying a response to the message contained in the uplink frame. The response is transmitted from the server to the gateway designated in an HTTP request, then in unicast mode, from the designated gateway to the terminal in a downlink frame in accordance with the LoRaWAN protocol.

It therefore appears that LoRa networks would be an interesting solution for enabling sensors and actuators used for managing an LV network to communicate with a centralised unit. However, it is known that LV networks cover territories very finely, which is not the case with LPWAN networks such as the LoRa networks. Some areas covered by LV networks are not covered by an LPWAN network. However, transferring information from sensors and controlling actuators must also be possible in these areas that are not covered. Moreover, LoRa networks are public networks, shared by many users. Transmitting sensitive data such as data allowing management of an LV network over a LoRa network may appear risky.

It is desirable to overcome these drawbacks of the prior art. It is in particular desirable to propose a solution that enables a centralised unit to receive information from sensors and/or to control actuators situated in any areas of an LV network.

It is also desirable to provide a solution that is simple to implement at low cost.

According to a first aspect of the present invention, the present invention relates to equipment adapted for being connected to a system for the automatic management of electricity meter readings, referred to as an AMM system, the AMM system comprising at least one data concentrator to which smart electricity meters, referred to as meters, are attached, via a first powerline network, each data concentrator being connected to a management system comprising a management entity via a second network and serving as a relay between said meters and the management system. The equipment is connected to a data concentrator, referred to as a relay concentrator, via a third network, said equipment comprises at least one interface for communication with a fourth network, said fourth network enabling at least one device connected to said fourth network to communicate with the equipment. Said equipment being able to receive data from one or more devices connected to the fourth network, to check that the data received are in accordance with a predetermined criterion dependent on a type of data transmitted and to transmit an alarm to an administration server included in the management system in the event of non-conformity of said data; and able to relay a command sent by the administration server and intended for a device connected to the fourth network.

In this way, the equipment makes it possible to benefit from the AMM system in order to transfer data to the administration server.

According to one embodiment, the equipment comprises a first interface for communication with a first fourth long-range network with low energy consumption, referred to as an LPWAN network, and/or a second interface for communication with a second fourth cabled network.

According to a second aspect of the invention, the invention relates to a communication system based on a system for the automatic management of electricity meter readings, referred to as an AMM system, comprising at least one item of equipment according to the first aspect.

According to one embodiment, each device connected to the first or to the second fourth network is a sensor or an actuator.

According to one embodiment, the second fourth network is a network of the RS485 type and each data item or command transmitted over the second fourth network is transmitted in a frame in accordance with the Modbus protocol.

According to one embodiment, each data item or command transmitted over the LPWAN network is transmitted in a frame in accordance with a proprietary protocol using a physical layer identical to a physical layer used by the LoRaWAN protocol and a proprietary application-level payload format.

By using a proprietary protocol, security problems inherent in shared networks such as LoRa networks are avoided.

According to one embodiment, the proprietary payload format comprises a first field for defining a type of device involved either as a destination or as a sender of the frame, a second field for transporting a value representing a command when the frame is intended for a device of the actuator type, a value representing a data type when the frame is exchanged with a device of the sensor type or a value representing an acknowledgement of receipt, a third field indicating how many data bytes are present in the payload of the frame and optionally, according to a value of the third field, one or more fourth data fields.

According to one embodiment, the system is adapted for executing a connection procedure when a device is to be connected to said LPWAN network. The connection procedure comprises: sending, by said device, a connection request in accordance with the proprietary protocol in broadcast mode; relaying, by each item of equipment in said system that received said request, said request to the relay concentrator to which the equipment is attached; relaying, by each relay concentrator to which an item of equipment that relayed the request is attached, said request to the management entity; choosing, by the management entity, among the items of equipment that relayed said request, an item of equipment to be associated with said device; transmitting to said device, by the management entity, via the relay concentrator to which the chosen equipment is attached and chosen equipment, a connection-enabling request.

According to one embodiment, the system is adapted for executing a connection procedure when a device is to be connected to an item of equipment by said second fourth network, the connection procedure comprising: creating, by said equipment, a virtual device representing the device that is to be connected to the second fourth network; creating, by said virtual device, a connection request in accordance with the proprietary protocol; transmitting, by the equipment, to the management entity, via the relay concentrator attached to the equipment, the connection request; transmitting, to said virtual device, by the management entity, via the relay concentrator to which the equipment is attached and the equipment, a connection-enabling request.

According to one embodiment, the system is adapted for executing a procedure for transmitting a command to a device of the actuator type, the procedure for transmitting a command comprising transmitting a command to said device, by the administration server, via the management entity, the relay concentrator to which the equipment associated with said device of the actuator type is attached and the equipment associated with said device of the actuator type.

According to one embodiment, the procedure for transmitting a command further comprises transmitting, by said device of the actuator type, an acknowledgement of receipt for the command to the administration server, via the equipment associated with said device of the actuator type, the relay concentrator to which the equipment associated with said device of the actuator type is attached and the management entity.

According to one embodiment, the system is adapted for executing a data transmission procedure, the data transmission procedure comprising, for each device of the sensor type transmitting data, transmitting, by said device of the sensor type, data in a frame in accordance with the proprietary protocol to the equipment associated with said sensor, the transmission of the alarm to the administration server in the event of non-conformity of data received by equipment taking place via the relay concentrator to which the equipment that noted said non-conformity is attached.

According to one embodiment, the transmission by said device of the sensor type of the data in a frame in accordance with the proprietary protocol to the equipment associated with said device of the sensor type follows a reception by said device of the sensor type of a request in accordance with the proprietary protocol sent by said equipment requesting a transmission of said data.

According to a third aspect of the invention, the invention relates to a method for transferring an alarm executed by equipment connected to a communication system based on a system for the automatic management of electricity meter readings, referred to as an AMM system, the AMM system comprising at least one data concentrator to which smart electricity meters, referred to as meters, are attached, via a first powerline network, each data concentrator being connected to a management system comprising a management entity via a second network and serving as a relay between said meters and the management system. The equipment is connected to a data concentrator, referred to as a relay concentrator, via a third network and comprises at least one first interface for communication with a first fourth network of the long range and low energy consumption type, referred to as an LPWAN network, said LPWAN network enabling at least one device connected to said LPWAN network to communicate with the equipment using a proprietary protocol using a physical layer identical to a physical layer used by the LoRaWAN protocol and frames comprising an application-level payload having a proprietary format, and/or at least one second interface for communication with a second fourth network of the cabled type in which each data or command transmitted is transmitted in a frame in accordance with the Modbus protocol. The method comprises receiving, from one or more devices of the sensor type, data in a frame in accordance with the proprietary protocol; checking that the data received are in accordance with a predetermined criterion dependent on a type of data transmitted; and transmitting an alarm to an administration server included in the management system in the case of non-conformity of said data, the transmission taking place via the relay concentrator and the management entity.

According to a fourth aspect of the invention, the invention relates to a method for communication between a device and an administration server included in a communication system based on a system for automatic management of electricity meter readings, referred to as an AMM system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system. The communication system comprises at least one item of equipment connected to a data concentrator, referred to as a relay concentrator, via a third network, the equipment comprising at least one interface for communication with a fourth network of the long-range type with low energy consumption, referred to as an LPWAN network, said LPWAN network enabling at least one device connected to said LPWAN network to communicate with the equipment using a proprietary protocol using a physical layer identical to a physical layer used by the LoRaWAN protocol and frames comprising an application-level payload having a proprietary format. The method comprises a procedure for connection of said device to said fourth network comprising: sending, by said device, a connection request in accordance with the proprietary protocol in broadcast mode; relaying, by said equipment of said system that received the request, said request to the relay concentrator to which the equipment is attached; relaying, by each relay concentrator to which equipment that relayed the request is attached, said request to the management entity; choosing, by the management entity, among the equipment that relayed said request, equipment to be associated with said device; transmitting to said device, by the management entity, via the relay concentrator to which the chosen equipment is attached and the chosen equipment, a connection-enabling request.

According to a fifth aspect of the invention, the invention relates to a method for communication between a device and an administration server included in a communication system based on a system for automatic management of electricity meter readings, referred to as an AMM system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system. The communication system comprises at least one item of equipment connected to a data concentrator, referred to as a relay concentrator, via a third network, the equipment comprising at least one interface for communication with a fourth network of the cabled type wherein each data or command transmitted is transmitted in a frame in accordance with the Modbus protocol, and in that the method comprises a procedure for connection of said device to said fourth network comprising: creating, by said equipment, a virtual device representing the device that is to be connected to the fourth network; creating, by said virtual device, a connection request in accordance with the proprietary protocol; transmitting, by the equipment, to the management entity, via the relay concentrator attached to the equipment, the connection request; transmitting, to said virtual device, by the management entity, via the relay concentrator to which the equipment is attached and the equipment, a connection-enable request.

According to a sixth aspect of the invention, the invention relates to a method for transmitting a command between an administration server and a device included in a communication system based on a system for automatic management of electricity meter readings, referred to as an AMM system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system. The communication system comprises an item of equipment, associated with said device and connected to a data concentrator, referred to as a relay concentrator, via a third network, the equipment comprising at least one first interface for communication with a first fourth network of the long-range type and with low energy consumption, referred to as an LPWAN network, said LPWAN network enabling at least one device connected to said LPWAN network to communicate with the equipment using a proprietary protocol using a physical layer identical to a physical layer used by the LoRaWAN protocol and frames comprising an application-level payload having a proprietary format, and/or at least one second interface for communication with a second fourth network of the cabled type wherein each data item or command transmitted is transmitted in a frame in accordance with the Modbus protocol. The method comprises transmitting a command to said device, by the administration server, via the management entity, the relay concentrator to which the equipment associated with said device is attached and the equipment associated with said device.

According to a seventh aspect of the invention, the invention relates to a computer program, comprising instructions for implementing, by a device, the method according to the third aspect or at least one step of the method according to the fourth, fifth or sixth aspect when said program is executed by a processor of said device.

According to an eighth aspect of the invention, the invention relates to storage means storing a computer program comprising instructions for implementing, by a device, the method according to the third aspect or at least one step of the method according to the fourth, fifth or sixth aspect when said program is executed by a processor of said device.

The features of the invention mentioned above, as well as others, will emerge more clearly from the reading of the following description of an example embodiment, said description being given in relation to the accompanying drawings, among which.

The invention is described in a context of an AMM system used for supervising an LV network wherein it is wished to insert devices allowing smart management of said LV network. The devices described hereinafter are sensors, such as temperature, pressure and movement sensors, and actuators. The invention is also adapted to other contexts where the purpose of the insertion of devices would not be to allow management of an LV network. For example, the invention could enable connected objects that are not within range of an LPWAN network such as a LoRa network to transfer information to a management server by means of the LV network.

Figure 1:
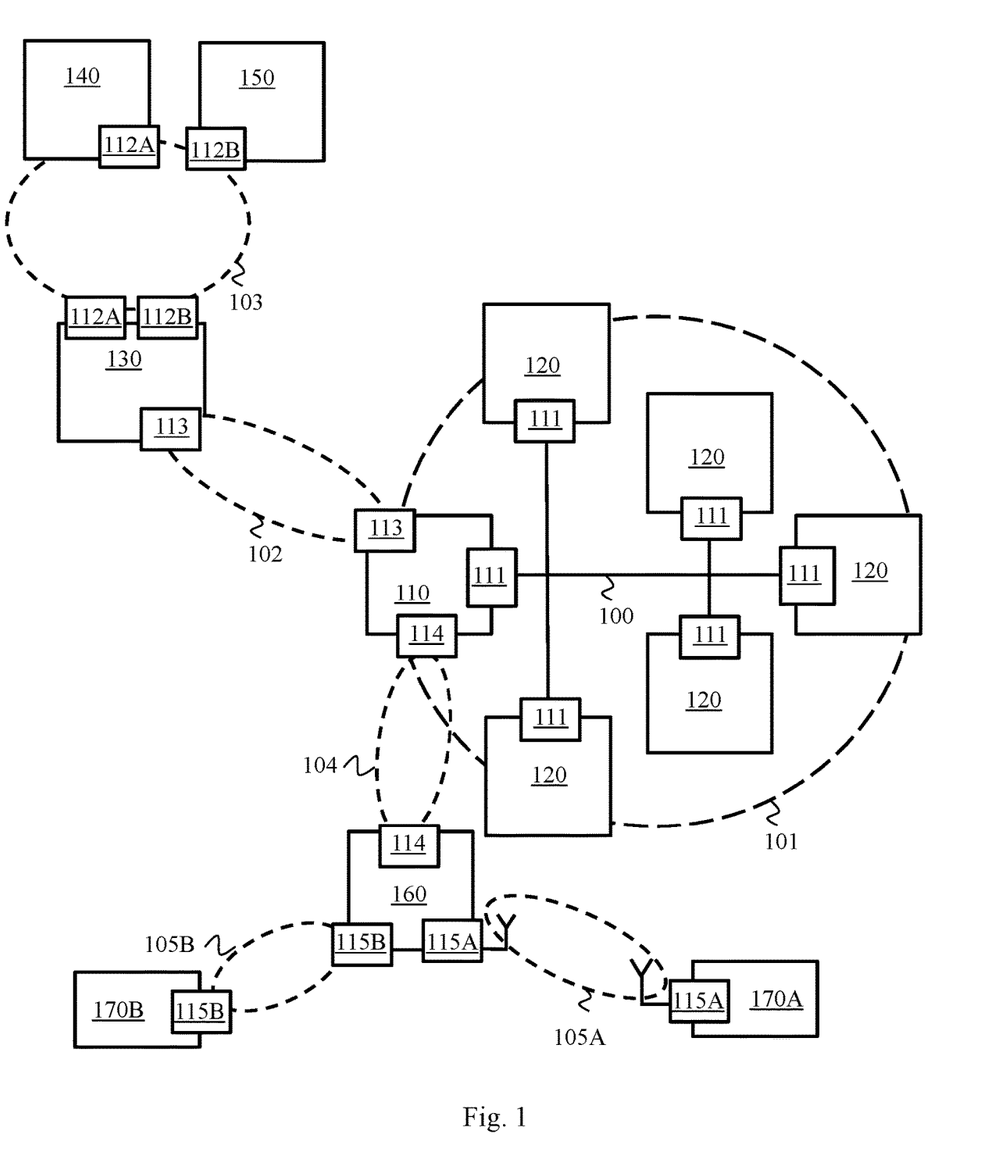
FIG. 1 illustrates schematically an example of a powerline communication system wherein the invention is implemented.

FIG. 1 illustrates schematically an example of implementation of the invention in an AMM system.

The AMM system of FIG. 1 comprises a management entity 130, also referred to as the headend, and a plurality of meters 120. The management entity 130 is in particular responsible for gathering information transmitted by the meters 120, such as information on readings of electricity consumption of electrical installations that said meters 120 are responsible for monitoring. To enable said meters 120 to transmit said information to the management entity 130, PLC communications are established between each of said meters 120 and a data concentrator 110. The communication system typically comprises a plurality of data concentrators 110, only one being shown in FIG. 1. A plurality of meters 120 are connected logically to each data concentrator 110, each data concentrator 110 thus serving as a relay between said meters 120 that are connected thereto and the management entity 130.

A PLC network 101 is thus formed between each data concentrator 110 and the plurality of meters 120 that is connected thereto. This PLC network 101 relies on an electrical distribution network (i.e. LV network) 100 serving to supply electricity to the electrical installations that said meters 120 are responsible for monitoring. Each meter 120 thus comprises a PLC communication interface 111 for communicating via the PLC network 101. Likewise, each data concentrator 110 comprises such a PLC communication interface 111 for communicating via the PLC network 101. According to an example embodiment, the PLC network 101 is in accordance with the G3-PLC protocol. According to another embodiment, the PLC network 101 is in accordance with the PRIME protocol.

To make it possible to relay the information transmitted by the meters 120 to the management entity 130, each data concentrator 110 further comprises an interface 113 for communication with a communication network 102, to which the management entity 130 is also connected. Since the data concentrators 110 may typically be installed in transformer stations of the LV network 100, the communication network 102 is preferentially a wireless telecommunication network. According to one embodiment, the communication network 102 is in accordance with the UMTS (Universal Mobile Telecommunications System) standard. According to another embodiment, the communication network 102 is in accordance with the LTE (Long Term Evolution) standard.

The management entity 130 thus comprises an interface 113 for communication via the communication network 102 enabling it to communicate with a plurality of data concentrators 110. The management entity 130 is preferentially in accordance with the set of IEC 62056 standards, i.e. the DLMS (Device Language Message Specification) and COSEM (Companion Specification for Energy Metering) specifications.

The communication system of FIG. 1 also comprises an MDM (Meter Data Management) server 140. The MDM server 140 receives the information on electricity consumption metering gathered by the management entity 130 and processes it.

To enable the MDM server 140 to receive the information on electricity consumption metering gathered by the management entity 130, the MDM server 140 and the management entity 130 further comprise an interface 112A for communication with a communication network 103. The communication network 103 is preferentially a network of the IP type (Internet Protocol, as defined in the normative document RFC 791), such as the internet. In one embodiment, the communications between the management entity 130 and the MDM server 140 use HTTP requests.

At least one data concentrator 110 of the AMM system of FIG. 1 comprises an interface 114 for communication with a communication network 104 to which a unit 160 called a metering centre is connected by the same communication interface 114. Hereinafter, each data concentrator 110 comprising a communication interface 114 is referred to as a relay concentrator. A data concentrator is configured as a relay concentrator for example when it is situated in an area not covered by an LPWAN network such as a LoRa network. A metering centre 160 communicating with a relay concentrator 110 is said to be attached to said relay concentrator 110. In one embodiment, the network 104 is an Ethernet network (ISO/IEC 8802-3). The metering centre 160 implements a DLMS server and the relay concentrator 110 to which it is attached implements a DLMS client.

The metering centre 160 comprises at least one interface 115A for communication with an LPWAN network 105A using the same physical layer as the LoRa networks. The network 105A enables the metering centre 160 to communicate with at least one device 170A, each device 170A being connected to the network 105A by means of a communication interface 115A. In FIG. 1, only one device 170A is shown. The device 170A may be a sensor or an actuator. The metering centre 160 and the device 170A communicate in accordance with a proprietary protocol similar to the LoRaWAN protocol that we describe below in relation to FIGS. 3, 4A, 4B, 4C, 5 and 6.

In one embodiment, the metering centre 160 also comprises a communication interface 115B. The communication interface 115B enables the metering centre 160 to communicate with at least one device 170B. The device 170B may be an actuator or a sensor. Each device 170B has an interface 115B. Each communication interface 115B is connected to a cabled communication network 105B of the RS485 type. In FIG. 1, only one device 170B is shown. The device 170B communicates with the metering centre 160 in accordance with the Modbus protocol.

As we shall see hereinafter in relation to FIG. 7, the metering centre 160 receives information from the devices 170A, when these devices are sensors, and analyses this information. According to a result of this analysis, the metering centre 160 generates alarms if necessary and transmits each alarm generated to an administration server 150 included in the communication system 1. The administration server or ADMS (Advanced Distribution Management System) server 150 collects the alarms coming from the metering centre and processes them. Each transmission of an alarm between the metering centre 160 and the administration server 150 takes place via the relay concentrator 110 to which the metering centre 160 is attached and the management entity 130. Like the MDM server 140, the administration server 150 comprises an interface 112A for communication with the communication network 103. The communications between the management entity 130 and the administration server 150 use for example HTTP requests.

Moreover, as we describe below in relation to FIG. 8, the metering centre 160 relays commands intended for the devices 170A or 170B, when these devices are actuators, coming from the management server 150. The commands, when they are intended for an actuator 170A, are called proprietary commands. The commands, when they are intended for a device 170B of the actuator type, are in accordance with the Modbus protocol and are called Modbus commands. Each transmission of a command from the administration server 150 to devices 170A or 170B of the actuator type is done via the management entity 130 and the relay concentrator 110 to which the metering centre 160 is attached.

A metering centre 160 therefore has increased capacities compared with a conventional LoRa gateway. Indeed, each metering centre 160 is not only capable of relaying data between an object such as a sensor or an actuator and an administration server 150, but also of analysing certain data collected and transmitting an alarm to the administration server 150 only according to the result of the analysis. This capacity for analysis has an important advantage since it limits the number of communications between each metering centre 160 and the administration server 150 to what is strictly necessary. In this way the risks of congesting the networks involved in the communications between the devices 170A and 170B and the administration server 150 (i.e. the network 103 and the network 102) are reduced.

In another embodiment, the network 104 is a PLC network.

In one embodiment, the metering centre 160 attached to a relay concentrator is integrated in the relay concentrator 110.

Each entity of the system in FIG. 1, whether a data concentrator 110, a meter 120 or the management entity 130, comprises a processing module 20 (not shown) enabling these entities to participate in an implementation of the invention.

Figure 2:
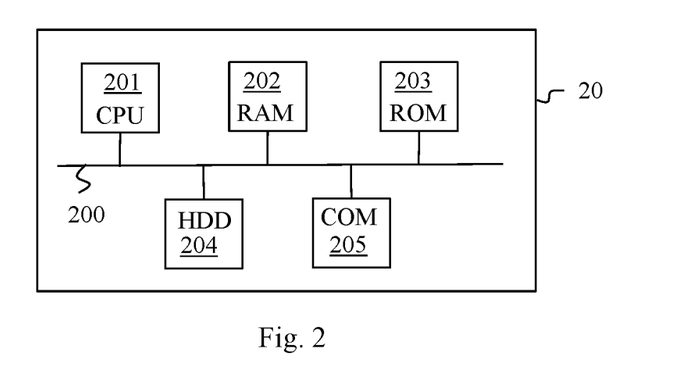
FIG. 2 illustrates schematically an example of hardware architecture of a processing module.

FIG. 2 illustrates schematically an example of hardware architecture of the processing module 20.

The processing module 20 then comprises, connected by a communication bus 200: a processor or CPU 201, a random access memory RAM 202; a read only memory ROM 203; a storage unit or a storage medium reader, such as an SD card reader 204; a set of communication interfaces 205 enabling the processing module 20 to communicate with other entities of the system in FIG. 1.

When the processing module 20 is included in a meter 120, the set of communication interfaces 205 comprises the interface 111 for communication to the PLC network 101.

When the processing module 20 is included in a data concentrator 110, the set of communication interfaces 205 comprises the interface 111 for communication to the PLC network 101 and the interface 113 for communication to the communication network 102.

When the processing module 20 is included in a data concentrator 110 that serves as a relay concentrator, the set of communication interfaces 205 also comprises the interface 114 for communication to the network 104.

When the processing module 20 is included in the management entity 130, the set of communication interfaces 205 comprises the interface 113 for communication to the communication network 102, the interface 112A for communication to the communication network 103 and the interface 112B for communication to the communication network 103.

When the processing module 20 is included in the MDM server 140, the set of communication interfaces 205 comprises the interface 112A for communication to the network 103.

When the processing module 20 is included in the administration server 150, the set of communication interfaces 205 comprises the interface 112B for communication to the network 103.

When the processing module 20 is included in the metering centre 160, the set of communication interfaces 205 comprises the interface 114 for communication to the network 104, at least the interface 115A for communication to the network 105A and optionally the interface 115B for communication to the communication network 105B.

When the processing module 20 is included in a device 170A, the set of communication interfaces 205 comprises the interface 115A for communication to the network 105A.

When the processing module 20 is included in a device 170B of the actuator type, the set of communication interfaces 205 comprises the interface 115B for communication to the network 105B.

The processor 201 is capable of executing instructions loaded in the RAM 202 from the ROM 203, from an external memory (not shown), from a storage medium, such as an SD card, or from a communication network. When the entity (i.e. the data concentrator 110, a meter 120, the management entity 130, the MDM server 140, the administration server 150, a metering centre 160, a device 170A, a device 170B) is powered up, the processor 201 is capable of reading instructions from the RAM 202 and executing them. These instructions form a computer program causing the implementation, by the processor 201, of a part of the method described in relation to FIGS. 7, 8 and 9 relating to said entity.

Figure 7:
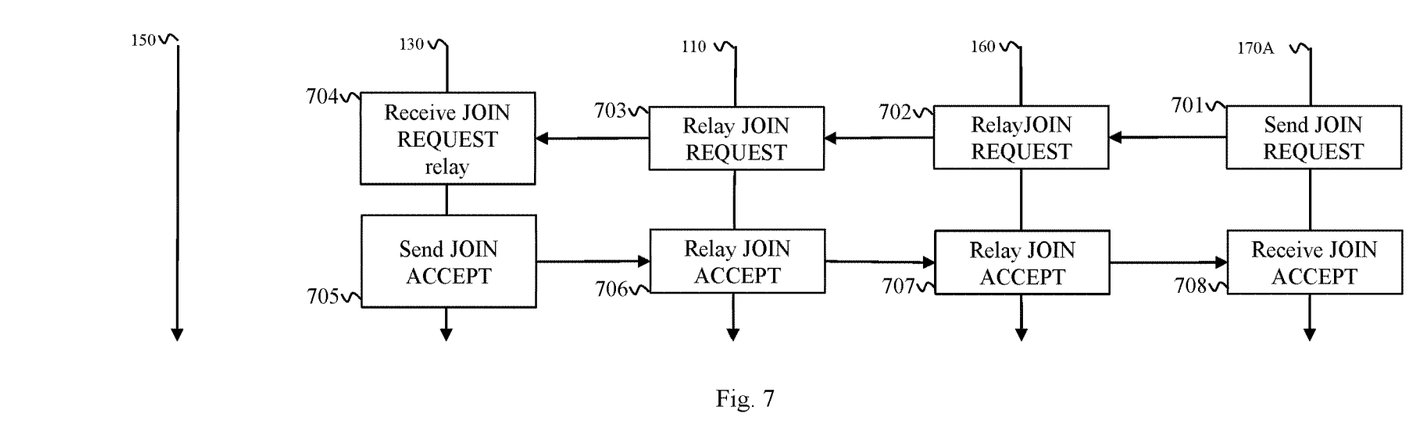
FIG. 7 illustrates schematically an example of a procedure for connection to an LPWAN network enabling a metering centre and a sensor or an actuator to communicate.
Figure 8:
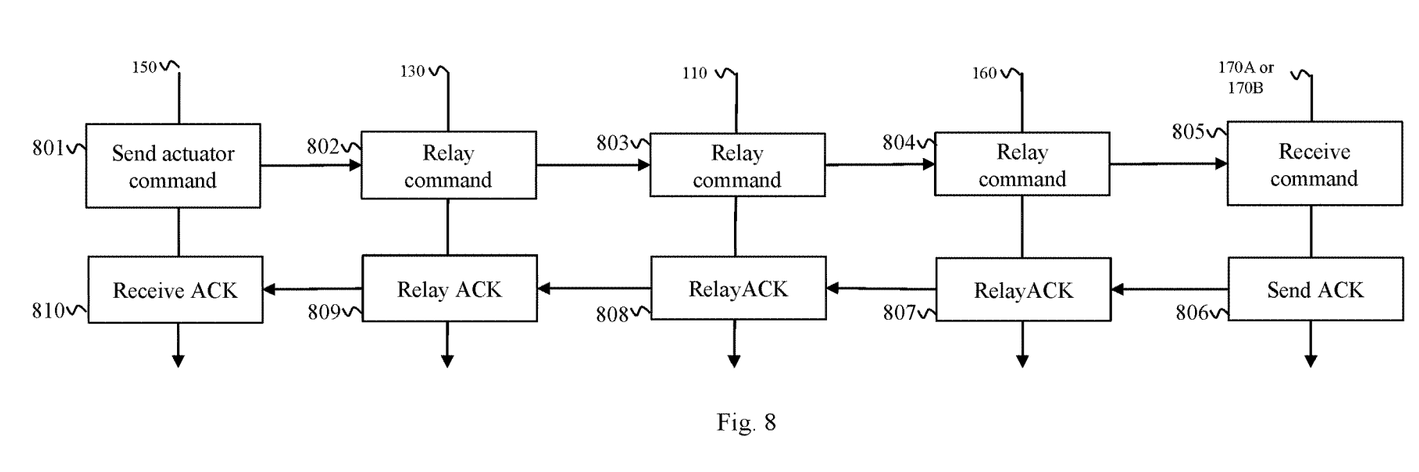
FIG. 8 illustrates schematically an example of a procedure for transmitting a command to an actuator; and, FIG. 9 illustrates schematically an example of a procedure for transmitting data emanating from a sensor.
Figure 9:
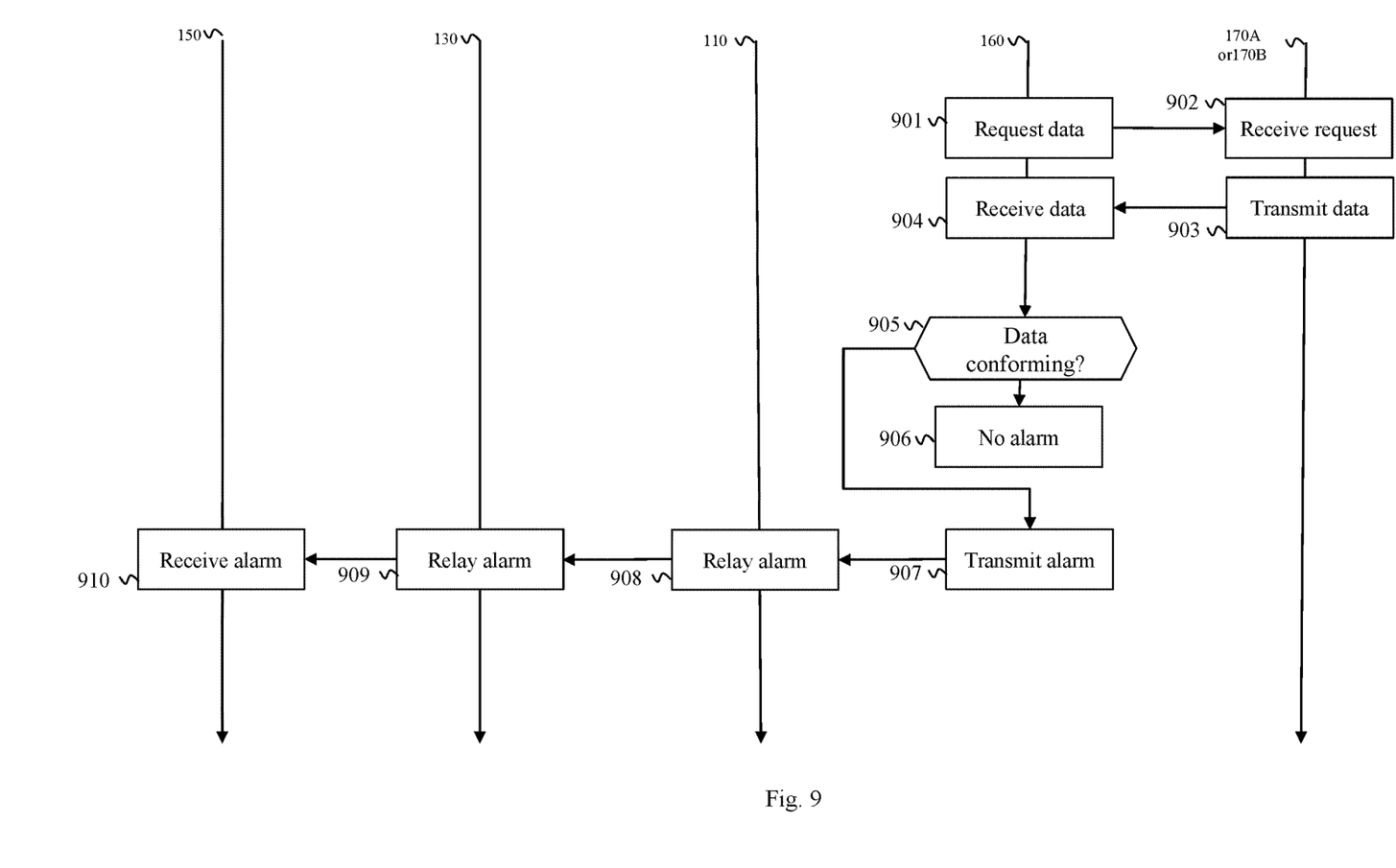

All or part of the method described in relation to FIGS. 7, 8 and 9 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIGS. 3, 4A, 4B, 4C, 5 and 6 describe a physical-level frame syntax used for the frames exchanged between a metering centre 160 and a device 170A.

Figure 3:
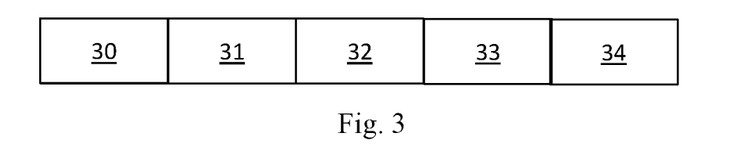
FIG. 3 illustrates schematically a physical-level frame according to the invention exchanged between a sensor or an actuator and a metering centre according to the invention.

FIG. 3 illustrates schematically a physical-level frame according to the invention exchanged between a device 170A and a metering centre 160.

The physical-level frame shown in FIG. 3 is very similar to a physical-level frame in accordance with the LoRaWAN protocol. These frames are used on the network 105A between the devices 170A and the metering centres 160. The frame comprises in fact a field preamble, a field PDHR, a field PHDR_CRC and a field CRC, the format and semantics of which are strictly identical to the format of the fields bearing the same name in the LoRaWAN protocol. Only a field PHYPayload representing a physical-level payload of the frame differs from the field with the same name in the LoRaWAN protocol. We detail the field PHYPayload in relation to FIGS. 4A, 4B, 4C, 5 and 6.

Figure 4A:
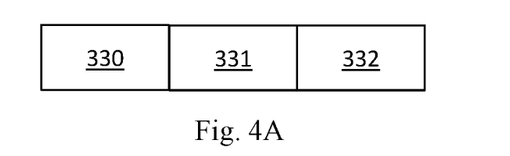
FIG. 4A illustrates schematically a first example of a payload of a physical-level frame according to the invention intended to transport data or commands.

FIG. 4A illustrates schematically a first example of a payload of a physical-level frame according to the invention intended to transport data or proprietary commands.

In the example in FIG. 4A, the payload of a physical-level frame comprises a field MHDR 330, a field payload 331 and a field MIC 332. The format and the semantics of the fields MHDR 330 and MIC 332 are strictly identical to the format and to the semantics of the fields of the same name in the LoRaWAN protocol. The field MHDR 330 is an MAC (medium access control) level header and comprises two fields: a field MTYPE and a field RFU. The field RFU (reserved for future use) is a field reserved for future uses. The field MTYPE indicates the type of frame. Frame types are defined in the LoRaWAN protocol in the form of three-bit binary values. For example, the binary value 000 corresponds to a join request frame. The binary value 001 corresponds to a join accept frame. The binary value 111 is left free to make it possible to define a proprietary frame. In the context of the invention, the binary value 111 is used for defining frames for exchanging data or proprietary commands with sensors.

The field payload 331 corresponds to an MAC-level payload that we detail below in relation to FIG. 5.

Figure 4B:
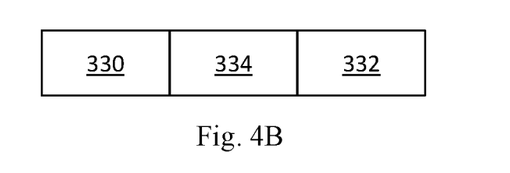
FIG. 4B illustrates schematically a second example of a payload of a physical-level frame according to the invention intended to transport a request for connection to a network.

FIG. 4B illustrates schematically a second example of a payload of a physical-level frame according to the invention intended to transport a request to join a network.

In the example in FIG. 4B, the payload of a physical-level frame comprises a field MHDR 330, a field Join-Request 334 and a field MIC 332. The field Join-Request 334 is identical to the field of the same name of the LoRaWAN protocol. Hereinafter a physical-level frame comprising a field Join-Request 334 will be called a join request. When the field Join-Request 334 is present in a frame, the field MTYPE takes the binary value 000.

Figure 4C:
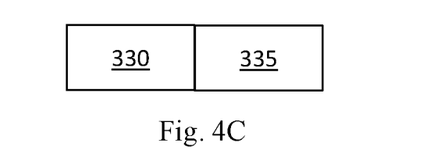
FIG. 4C illustrates schematically a third example of a payload of a physical-level frame according to the invention intended to transport an authorisation for connection to a network.

FIG. 4C illustrates schematically a third example of a payload of a physical-level frame according to the invention intended to transport an authorisation to join a network.

In the example in FIG. 4C, the payload of a physical-level frame comprises a field MHDR 330 and a field Join-Accept 335. The field Join-Accept 335 is identical to the field with the same name of the LoRaWAN protocol. A physical-level frame comprising a field Join-Accept 335 will hereinafter be referred to as a join-accept request. When the field Join-Accept 335 is present in a frame, the field MTYPE takes the binary value 001.

Figure 5:
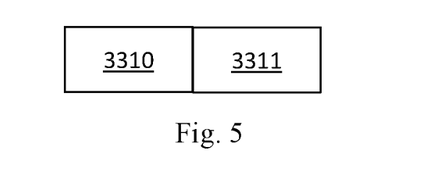
FIG. 5 illustrates schematically an MAC-level payload included in the payload of a physical-level frame according to the invention.

FIG. 5 illustrates schematically an MAC-level payload included in the payload of a physical-level frame according to the invention.

The MAC-level payload described in relation to FIG. 5 corresponds to the field payload 331 in FIG. 4A. The MAC-level payload comprises a field FHDR 3310 and a field FRMPayload 3311. The field FHDR is identical to the field with the same name in the LoRaWAN protocol. The field FRMPayload 3311 is a proprietary field. When the field FRMPayload 3311 is present in a frame, the field MTYPE takes the binary value 111.

Figure 6:
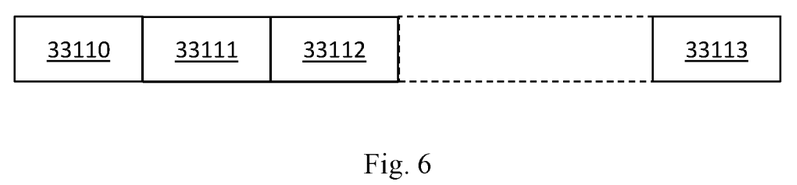
FIG. 6 illustrates schematically an application-level payload included in the MAC-level payload.

FIG. 6 illustrates schematically an application-level payload included in the MAC-level payload.

The application-level payload corresponds to the field FRMPayload 3311 in FIG. 5.

The application-level payload comprises a field Device-Type 33110 coded in one byte, a field CommandDataType 33111 coded in one byte, a field NumData 33112 coded in one byte, and a series of optional fields of one byte data 33113 intended to receive data to be transmitted.

The field DeviceType 33110 makes it possible to define a device type involved either as a destination or as a sender of the frame. In one embodiment, the field Device Type 33110 takes the value 0 for an actuator and the value 1 for a sensor.

The field CommandDataType 33111 makes it possible to transport a value representing a command when the field DeviceType 33110 is at 0, a value representing a data type when the field DeviceType 33110 is at 1 and a value representing an acknowledgement of receipt, commonly called ACK, whether the value of the field DeviceType 33110 is 0 or 1.

When the command is a closure, the field CommandDataType 33111 takes the value 0.

When the command is an opening, the field CommandDataType 33111 takes the value 1.

When the frame is an acknowledgement of reception, the field CommandDataType 33111 takes the value 2.

When the device involved as destination or sender of the frame is a sensor, the field CommandDataType 33111 may take a plurality of values comprising the following values:

3 when the sensor is a temperature sensor. The data transported are then data representing a temperature.

4 when the sensor is a pressure sensor. The data transported are then data representing a pressure.

5 when the sensor is a humidity sensor. The data transported are then data representing a humidity level.

6 when the sensor is a movement sensor. The data transported are then data representing a movement amplitude.

7 when the sensor is a magnetic-field sensor. The data transported are then data representing a norm, an axis and a direction of a magnetic field.

8 when the sensor is a brightness sensor. The data transported are then data representing a brightness level.

The plurality of values, and therefore the sensor types, are not limitative.

The field NumData 33112 indicates how many data bytes are present in the frame, i.e. how many fields data 33113 are present in the frame. The field NumData 33112 takes the value 0 when the device concerned is an actuator or the frame transports an acknowledgement of reception. When the frame transports data, the field NumData 33112 takes a value greater than or equal to unity.

A physical-level frame as described in relation to FIG. 3 comprising a field FRMPayload 3311, the field Device Type 33110 of which is at 0 and the field CommandDataType 33111 of which is at 0 or 1 is a proprietary command.

A physical-level frame as described in relation to FIG. 3 comprising a field FRMPayload 3311, the field Device Type 33110 of which is at 0 or 1 and the field CommandDataType 33111 of which is at 2 is called proprietary ACK hereinafter.

A physical-level frame as described in relation to FIG. 3 comprising a field FRMPayload 3311, the field Device Type 33110 of which is at 1 and the field CommandDataType 33111 of which is at 3 or 4 or 5 or 6 or 7 or 8 but the field NumData 33112 of which is at 0 is called proprietary data request hereinafter.

A physical-level frame as described in relation to FIG. 3 comprising a field FRMPayload 3311, the field Device Type 33110 of which is at 1, the field CommandDataType 33111 of which is at 3 or 4 or 5 or 6 or 7 or 8 and the field NumData 33112 of which is at a value greater than or equal to unity is called proprietary data packet hereinafter.

It should be noted that the physical-level frames are encrypted in accordance with the LoRaWAN protocol. Each sensor device or actuator has identifiers DevEUI and AppEUI (also called JoinEUI), and factory-preprogrammed keys AppKey and NetSKey as defined in the LoRaWAN protocol.

As in a conventional LoRa network wherein a connected object must perform a procedure of connection to the LoRa network in order to be able to communicate on said network, each device 170A must perform a procedure of connection to the LPWAN network 105A in order to be able to communicate with a metering centre 160.

FIG. 7 illustrates schematically an example of a procedure for connection to the LPWAN network 105A enabling the metering centre 160 and the device 170A to communicate.

In a step 701, the device 170A generates a join request as described in relation to FIGS. 3 and 4B and sends this join request in broadcast mode.

Each metering centre 160 within range of the device 170A receives this join request, encapsulates this join request in a frame conforming to the DLMS/COSEM specifications, and transmits the frame thus formed to the relay concentrator 110 to which the metering centre 160 is attached in a step 702.

In a step 703, each relay concentrator 110 to which a metering centre 160 that relayed the join request is attached receives a frame conforming to the DLMS/COSEM specifications encapsulating the join request, and retransmits said frame to the management entity 130.

In a step 704, for the same join request coming from a device 170A, the management entity 130 may therefore receive a plurality of frames conforming to the DLMS/COSEM specifications. The management entity 130 must decide with which metering centre 160 the device 170A must be associated. When a single metering centre 160 has relayed the join request of the device 170A, the management entity 130 associates this metering centre 160 with the device 170A. If a plurality of metering centres 160 have relayed the join request of the device 170A, the management entity 103 chooses one of these metering centres 160, and associates the chosen metering centre 160 with the device 170A. In one embodiment, the management entity 103 chooses the metering centre 160 randomly among the metering centres 160 that relayed the join request.

In a step 705, the management entity 103 generates a join accept request intended for the device 170A, encapsulates this request in a frame conforming to the DLMS/COSEM specifications and transmits the request thus encapsulated to the relay concentrator 110 to which the metering centre 160 chosen by the management entity 103, referred to as the chosen metering centre, is attached.

In a step 706, the relay concentrator 110 to which the chosen metering centre 160 is attached receives the frame conforming to the DLMS/COSEM specifications comprising the join accept request and retransmits said frame to the chosen metering centre 160.

In a step 707, the chosen metering centre 160 receives the frame conforming to the DLMS/COSEM specifications comprising the join accept request, extracts the join accept request and transmits this join enable request in unicast mode to the sensor 170A.

In a step 708, the device 170A receives the join accept request.

Following this connection procedure, the device 170A communicates only with the metering centre 160 chosen. When the device 170A is a sensor, if the data transferred by the device 170A trigger an alarm, this alarm generated by the chosen metering centre 160 is transferred to the administration server 150 via the relay concentrator 110 to which the chosen metering centre 160 is attached.

In the case of the devices 170B, the connection procedure is almost identical. In this case, however, when a device 170B is attached in Modbus to the metering centre 160, an addressing of the Modbus type is performed locally (between the metering centre 160 and the device or devices 170B). So that the management entity 130 has knowledge of the devices 170B connected to the metering centre 160, the metering centre 160 causes each of these devices 170B to be treated as a virtual device 170B'. A virtual device 170B' is software executed by the metering centre 160 implementing each functionality and emulating a behaviour of a corresponding device 170B. The metering centre 160 next performs the steps 701, 702, 707 and 708 of the connection procedure described in relation to FIG. 7 for each device 170B. In the connection procedure of FIG. 7, the device 170A is replaced by a virtual device 170B' created by the metering centre 160. In the step 704, the management entity 130 can therefore receive only one frame conforming to the DLMS/COSEM specifications for the join request coming from the virtual device 170B'. There is therefore not any choice of the metering centre 160 to be associated with the virtual device 170B'. The metering centre 160 associated with the virtual device 170B' is necessarily the metering centre that created the virtual device 170B'. Performing the join procedure enables the metering centre 160 to match each virtual device 170B' with the corresponding device 170B.

When the device 170A is an actuator, each proprietary command coming from the administration server 150 intended for the device 170A passes through the chosen metering centre 160 and through the relay concentrator 110 to which the chosen metering centre 160 is attached.

FIG. 8 illustrates schematically an example of a procedure for transmitting a command to an actuator.

Each command intended for an actuator is generated by the administration server 150. In the remainder of the description of FIG. 8, the device 170A being an actuator, we speak of actuator 170A.

In a step 801, the administration server 150 generates a proprietary command (or respectively a Modbus command) intended for an actuator 170A (or respectively 170B). This proprietary or Modbus command is encapsulated in an HTTP request and transmitted to the management entity 130.

In a step 802, the management entity 130 receives the HTTP request, inserts the proprietary (or respectively Modbus) command in a frame conforming to the DLMS/COSEM specifications and transmits the frame to the relay concentrator 110 to which the metering centre 160 chosen for the actuator 170A (or respectively 170B) is attached.

In a step 803, the relay concentrator 110 receives the frame conforming to the DLMS/COSEM specifications and transmits said frame to the chosen metering centre 160.

In a step 804, the chosen metering centre 160 receives the frame conforming to the DLMS/COSEM specifications and transmits the proprietary (or respectively Modbus) command to the actuator 170A (or respectively 170B).

In a step 805, the actuator 170A (or respectively 170B) receives the command and initiates a procedure of execution of the command.

In a step 806, the actuator 170A (or respectively 170B) generates a proprietary ACK (or respectively a frame acknowledging reception in accordance with the Modbus protocol, hereinafter referred to as Modbus ACK). The proprietary ACK (or respectively the Modbus ACK) is transmitted to the chosen metering centre 160 associated with the actuator 170A (or respectively 170B).

In a step 807, the metering centre 160 receives the proprietary ACK (or respectively the Modbus ACK), inserts this proprietary ACK (or respectively this Modbus ACK) in a frame conforming to the DLMS/COSEM specifications and transmits said frame to the relay concentrator 110 to which the chosen metering centre 160 is attached.

In a step 808, the relay concentrator 110 receives the frame conforming to the DLMS/COSEM specifications and retransmits said frame to the management entity 130.

In a step 809, the management entity receives the frame conforming to the DLMS/COSEM specifications, inserts the proprietary ACK (or respectively the Modbus ACK) in an HTTP request and transmits the HTTP request to the administration server 150. The administration server 150 then knows that the proprietary (or respectively Modbus) command has been executed by the actuator 170A (or respectively 170B).

FIG. 9 illustrates schematically an example of a procedure for transmitting data coming from a sensor.

The procedure described in relation to FIG. 9 relates to the devices 170A of the sensor type, referred to as sensors 170A in the remainder of the description of FIG. 9. It could just as well apply to the devices 170B of the sensor type.

In a step 901, the metering centre 160 associated with the sensor 170A transmits a proprietary data request to the sensor 170A.

In a step 902, the sensor 170A receives the proprietary data request.

In a step 903, the sensor 170A transmits the required data to the measurement unit in a proprietary data packet.

In a step 904, the metering centre 160 receives the proprietary data packet.

In a step 905, the metering centre 160 checks that each value represented by the data received is in accordance with a predetermined criterion dependent on the type of data transmitted. If each value is in accordance with the predetermined criterion, the metering centre 160 decides not to trigger an alarm in a step 906. If at least one value is not in accordance with the predetermined criterion, the metering centre decides to trigger an alarm in a step 907. To do this, in the step 907, the metering centre 160 generates a request representing an alarm and transmits this request in a frame conforming to the DLMS/COSEM specifications to the relay concentrator 110 to which the metering centre 160 is attached. In one embodiment, the request representing an alarm comprises information representing a type of alarm. Information representing a type of alarm gives for example the type of sensor that caused the alarm.

In a step 908, the relay concentrator 110 receives the frame conforming to the DLMS/COSEM specifications and retransmits this frame to the management entity 130.

In a step 909, the management entity 130 receives the frame conforming to the DLMS/COSEM specifications, inserts the request representing an alarm in an HTTP request and transmits this HTTP frame to the administration server 150.

In a first example, the sensor 170A is a temperature sensor. The predetermined criterion in this case is that no temperature measured by the sensor 170A (and received by the metering centre 160) must be outside a range of values lying between −50 degrees Celsius and +100 degrees Celsius. An alarm is triggered when this criterion relating to the temperature values is not complied with. Information representing a type of alarm in this case is that the alarm has been triggered by a value transferred by a temperature sensor.

In a second example, the sensor 170A is a pressure sensor. The predetermined criterion in this case is that no pressure measured by the sensor 170A (and received by the metering centre 160) must be greater than 1 bar. An alarm is triggered when this criterion relating to the pressure values is not complied with. Information representing a type of alarm in this case is that the alarm has been triggered by a value transferred by a pressure sensor.

Following the reception of this alarm, the administration server may trigger an action, for example by sending a command to an actuator.

If for example the alarm has been triggered because a temperature sensor placed alongside an LV electrical installation has transferred a temperature value above 100 degrees Celsius, the administration server transmits a command to an actuator in order to cut off the electrical supply to this installation.

If for example the alarm has been triggered because a pressure sensor placed alongside an LV electrical installation has transferred a pressure value above 1 bar, the administration server transmits a command to an actuator in order to cut off the electrical supply to this installation.

In one embodiment, the step 901 is not performed. The sensors 170A decide by themselves to transmit a proprietary data packet, without being invited to do so by the metering centre 160.

In one embodiment, the metering centre 160 triggers an alarm only when a number of sensors 170A greater than a predefined number of sensors transfer to said metering centre 160 a value not conforming to a predetermined criterion dependent on the type of data measured.

The procedure described in relation to FIG. 9 shows therefore that not all the data transferred by the sensor 170A are transferred by the metering centres 160. Each metering centre 160 transmits information relating to the data that it receives only when this is necessary, that is to say when an alarm must be triggered. It can be considered that the method described in relation to FIG. 9 is an alarm-transfer method.

It should be noted that the management entity 130 and the administration server 150 form a system for managing the LV network.

In one embodiment, the management entity 130, the administration server 150 and optionally the MDM server 140 are integrated in a single entity.

In one embodiment, the communications between the devices 170A and the metering centres 160, between the metering centres 160 and the relay concentrators 110, between the relay concentrators 110 and the management entity 130 and between the management entity 130 and the administration server 150 are made secure by known methods.

The invention claimed is:

1. An equipment adapted for being connected to a system for the automatic management of electricity meter readings, referred to as an Automated Meter Management ("AMM") system, the AMM system comprising at least one data concentrator to which smart electricity meters, referred to as meters, are attached, via a first powerline network, each data concentrator being connected to a management system comprising a management entity via a second network and serving as a relay between said meters and the management system, wherein:

the equipment is connected to a data concentrator, referred to as a relay concentrator, via a third network, said equipment comprises at least one interface for communication with a fourth network, said fourth network enabling at least one device connected to said fourth network to communicate with the equipment, said equipment being configured to:

receive data from one or more devices connected to the fourth network, to check that the data received are in accordance with a predetermined criterion dependent on a type of data transmitted and to transmit an alarm to an administration server included in the management system in the event of nonconformity of said data; and relay a command sent by the administration server and intended for a device connected to the fourth network.

2. The equipment according to claim 1, wherein the equipment comprises at least one of: a first interface for communication with a first fourth long-range network with low energy consumption, referred to as an LPWAN network, or a second interface for communication with a second fourth cabled network.

3. The communication system based on a system for the automatic management of electricity meter readings, referred to as an AMM system, comprising at least one item of equipment according to claim 2.

4. The system according to claim 3, wherein each device connected to the first or to the second fourth network is a sensor or an actuator.

5. The system according to claim 4, wherein the second fourth network is a network of the RS485 type and each data item or command transmitted over the second fourth network is transmitted in a frame in accordance with a Modbus protocol.

6. The system according to claim 4, wherein each data item or command transmitted over the LPWAN network is transmitted in a frame in accordance with a proprietary protocol using a physical layer identical to a physical layer used by a long range wide area network ("LoRaWAN") protocol and a proprietary application-level payload format.

7. The system according to claim 6, wherein the proprietary payload format comprises a first field for defining a type of device involved either as a destination or as a sender of the frame, a second field for transporting a value representing a command when the frame is intended for a device of the actuator type, a value representing a data type when the frame is exchanged with a device of the sensor type or a value representing an acknowledgement of receipt, a third field indicating how many data bytes are present in the payload of the frame and optionally, according to a value of the third field, one or more fourth data fields.

8. The system according to claim 6, wherein the system is adapted for executing a connection procedure when a device is to be connected to said LPWAN network, the connection procedure comprising:

sending, by said device, a connection request in accordance with the proprietary protocol in broadcast mode;

relaying, by each item of equipment in said system that received said request, said request to the relay concentrator to which the equipment is attached;

relaying, by each relay concentrator to which an item of equipment that relayed the request is attached, said request to the management entity;

choosing, by the management entity, among the items of equipment that relayed said request, an item of equipment to be associated with said device;

transmitting to said device, by the management entity, via the relay concentrator to which the chosen equipment is attached and chosen equipment, a connection-enabling request.

9. The system according to claim 5, wherein the system is adapted for executing a connection procedure when a device is to be connected to an item of equipment by said second fourth network, the connection procedure comprising:

creating, by said equipment, a virtual device representing the device that is to be connected to the second fourth network;

creating, by said virtual device, a connection request in accordance with the proprietary protocol;

transmitting, by the equipment, to the management entity, via the relay concentrator attached to the equipment, the connection request;

transmitting, to said virtual device, by the management entity, via the relay concentrator to which the equipment is attached and the equipment, a connection-enabling request.

10. The system according to claim 8, wherein the system is adapted for executing a procedure for transmitting a command to a device of the actuator type, the procedure for transmitting a command comprising transmitting a command to said device of the actuator type, by the administration server, via the management entity, the relay concentrator to which the equipment associated with said device of the actuator type is attached and the equipment associated with said device of the actuator type.

11. The system according to claim 10, wherein the procedure for transmitting a command further comprises transmitting, by said device of the actuator type, an acknowledgement of receipt for the command to the administration server, via the equipment associated with said device of the actuator type, the relay concentrator to which the equipment associated with said device of the actuator type is attached and the management entity.

12. The system according to claim 8, wherein the system is adapted for executing a data transmission procedure, the data transmission procedure comprising, for each device of the sensor type transmitting data, transmitting, by said device of the sensor type, data in a frame in accordance with the proprietary protocol to the equipment associated with said device of the sensor type, the transmission of the alarm to the administration server in the event of non-conformity of data received by equipment taking place via the relay concentrator to which the equipment that noted said non-conformity is attached.

13. The system according to claim 12, wherein the transmission by said device of the sensor type of the data in a frame in accordance with the proprietary protocol to the equipment associated with said device of the sensor type follows a reception by said device of the sensor type of a request in accordance with the proprietary protocol sent by said equipment requesting a transmission of said data.

14. A method for transferring an alarm executed by equipment connected to a communication system based on a system for the automatic management of electricity meter readings, referred to as an Automated Meter Management ("AMM") system, the AMM system comprising at least one data concentrator to which smart electricity meters, referred to as meters, are attached, via a first powerline network, each data concentrator being connected to a management system comprising a management entity via a second network and serving as a relay between said meters and the management system, wherein: the equipment is connected to a data concentrator, referred to as a relay concentrator, via a third network and comprises at least one of:
 at least one first interface for communication with a first fourth network of the long range and low energy consumption type, referred to as an LPWAN network, said LPWAN network enabling at least one device connected to said LPWAN network to communicate with the equipment using a proprietary protocol using a physical layer identical to a physical layer used by a long range wide area network ("LoRaWAN") protocol and frames comprising an application-level payload having a proprietary format; or
 at least one second interface for communication with a second fourth network of the cabled type in which each data or command transmitted is transmitted in a frame in accordance with a Modbus protocol; and
 wherein the method comprises:
 receiving data from one or more devices of the sensor type;
 checking that the data received are in accordance with a predetermined criterion dependent on a type of data transmitted; and
 transmitting an alarm to an administration server included in the management system in the case of non-conformity of said data, the transmission taking place via the relay concentrator and the management entity.

15. A method for communication between a device and an administration server included in a communication system based on a system for automatic management of electricity meter readings, referred to as an Automated Meter Management ("AMM") system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system, wherein the communication system comprises at least one item of equipment connected to a data concentrator, referred to as a relay concentrator, via a third network, the equipment comprising at least one interface for communication with a fourth network of the long-range type with low energy consumption, referred to as an LPWAN network, said LPWAN network enabling at least one device connected to said LPWAN network to communicate with the equipment using a proprietary protocol using a physical layer identical to a physical layer used by the a long range wide area network ("LoRaWAN") protocol and frames comprising an application-level payload having a proprietary format, and wherein the method comprises a procedure for connection of said device to said fourth network comprising:
 sending, by said device, a connection request in accordance with the proprietary protocol in broadcast mode;
 relaying, by said equipment of said system receiving the request, said request to the relay concentrator to which the equipment is attached;
 relaying, by each relay concentrator to which equipment that relayed the request is attached, said request to the management entity;
 choosing, by the management entity, among the equipment that relayed said request, equipment to be associated with said device; and
 transmitting to said device, by the management entity, via the relay concentrator to which the chosen equipment is attached and the chosen equipment, a connection-enabling request.

16. A method for communication between a device and an administration server included in a communication system based on a system for automatic management of electricity meter readings, referred to as an Automated Meter Management ("AMM") system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system, wherein the communication system comprises at least one item of equipment connected to a data concentrator, referred to as a relay concentrator, via a third network, the equipment comprising at least one interface for communication with a fourth network of the cabled type, wherein each data or command transmitted is transmitted in a frame in accordance with a Modbus protocol, and
 wherein the method comprises a procedure for connection of said device to said fourth network comprising:
 creating, by said equipment, a virtual device representing the device that is to be connected to the fourth network;
 creating, by said virtual device, a connection request in accordance with the proprietary protocol;
 transmitting, by the equipment, to the management entity, via the relay concentrator attached to the equipment, the connection request; and
 transmitting, to said virtual device, by the management entity, via the relay concentrator to which the equipment is attached and the equipment, a connection-enable request.

17. A method for transmitting a command between an administration server and a device included in a communication system based on a system for automatic management of electricity meter readings, referred to as an Automated Meter Management ("AMM") system, the AMM system comprising at least one data concentrator to which smart electricity meters, referred to as meters, are attached, via a first powerline network, each data concentrator being connected to a management system comprising the administration server and a management entity via a second network and serving as a relay between said meters and the management system,
 wherein the communication system comprises an item of equipment, associated with said device and connected to a data concentrator, referred to as a relay concentrator, via a third network, the equipment comprising:
 at least one first interface for communication with a first fourth network of the long-range type and with low energy consumption, referred to as an LPWAN network, said LPWAN network enabling at least one device connected to said LPWAN network to communicate with the equipment using a proprietary protocol using a physical layer identical to a physical layer used by the a long range wide area network ("LoRaWAN") protocol and frames comprising an application-level payload having a proprietary format; or at least one second interface for communication with a second fourth network of the cabled type wherein each data item or command transmitted is transmitted in a frame in accordance with a Modbus protocol, and wherein the method comprises:

transmitting a command to said device, by the administration server, via the management entity, the relay concentrator to which the equipment associated with said device is attached and the equipment associated with said device.

18. A non-transitory storage medium, storing a computer program comprising instructions for implementing, by a device, the method according to claim 14 when said program is executed by a processor of said device.

19. A non-transitory storage medium, storing a computer program comprising instructions for implementing, by a device, at least one step of the method according to claim 15 when said program is executed by a processor of said device.

20. A non-transitory storage medium, storing a computer program comprising instructions for implementing, by a device, at least one step of the method according to claim 16 when said program is executed by a processor of said device.

* * * * *